(12) United States Patent
Shtok et al.

(10) Patent No.: US 11,176,696 B2
(45) Date of Patent: Nov. 16, 2021

(54) POINT DEPTH ESTIMATION FROM A SET OF 3D-REGISTERED IMAGES

(71) Applicant: International Business Machines Corporation, Armonk, NY (US)

(72) Inventors: Joseph Shtok, Binyamina (IL); Yochay Tzur, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 137 days.

(21) Appl. No.: 16/409,933

(22) Filed: May 13, 2019

(65) Prior Publication Data

US 2020/0364893 A1  Nov. 19, 2020

(51) Int. Cl.
| | | |
|---|---|---|
| *G06T 7/593* | (2017.01) | |
| *G06F 16/51* | (2019.01) | |
| *G06N 3/02* | (2006.01) | |
| *G06T 7/73* | (2017.01) | |
| *G06T 3/40* | (2006.01) | |
| *G06N 3/04* | (2006.01) | |
| *G06N 3/08* | (2006.01) | |
| *G06T 7/60* | (2017.01) | |

(52) U.S. Cl.
CPC .............. *G06T 7/596* (2017.01); *G06F 16/51* (2019.01); *G06N 3/02* (2013.01); *G06N 3/04* (2013.01); *G06N 3/0454* (2013.01); *G06N 3/08* (2013.01); *G06T 3/40* (2013.01); *G06T 7/60* (2013.01); *G06T 7/74* (2017.01); *G06T 2207/20081* (2013.01); *G06T 2207/20084* (2013.01)

(58) Field of Classification Search
None
See application file for complete search history.

(56) References Cited

U.S. PATENT DOCUMENTS

| | | | |
|---|---|---|---|
| 9,786,062 B2 | 10/2017 | Sorkine-Hornung et al. | |
| 9,886,774 B2 | 2/2018 | Fathi et al. | |
| 2016/0210776 A1 | 7/2016 | Wanner et al. | |
| 2017/0084036 A1 | 3/2017 | Pheiffer et al. | |
| 2018/0107269 A1* | 4/2018 | Benzies | G06F 3/012 |
| 2019/0178628 A1* | 6/2019 | Lansel | G01B 11/005 |
| 2019/0206056 A1* | 7/2019 | Georgescu | G06K 9/00147 |

* cited by examiner

*Primary Examiner* — Jianxun Yang
(74) *Attorney, Agent, or Firm* — Gregory J Kirsch (57) ABSTRACT

Embodiments provide 3D coordinates for points in a scene that are observed to be in the correct physical position in a series of images. A method may comprise obtaining a plurality of images including a base image having at least one annotated point corresponding to a point of an object shown in the base image, and a plurality of side images showing the object from different viewpoints than the base image, wherein the plurality of side images are given with the camera poses relative to the base image, extracting from at least some of the side images, image patches showing the annotated point, wherein a plurality of sets of image patches are extracted, wherein a set of image patches is extracted at a plurality of corresponding candidate depth values, classifying each set as having a corresponding candidate depth value that is correct or incorrect, and outputting a correct depth value.

20 Claims, 5 Drawing Sheets

POINT DEPTH ESTIMATION FROM A SET OF 3D-REGISTERED IMAGES

BACKGROUND

The present invention relates to techniques that provide point depth estimation from a plurality of images forming a 3D registered set.

Recently, high-quality software for 3D mapping and tracking on mobile devices has become available. Such products produce a set of video frames of a scene registered to a common coordinate system. However, a good, stable 3D mesh, enveloping the physical scene, is difficult to produce and is not currently available. As a result, users are capable of interacting with the scene only where plain or homogeneous surfaces are identified.

Accordingly, a need arises for techniques that provide the 3D coordinates for points in a scene such that the points may be observed to be in the correct physical position in any of a series of images.

SUMMARY

Embodiments of the present systems and methods may provide techniques that provide the 3D coordinates for points in a scene such that the points may be observed to be in the correct physical position in any of a series of images. Embodiments may provide the capability to determine 3D points on general non-homogeneous surfaces, corresponding to image points, which may be designated by a user. Embodiments of the present systems and methods may provide the capability to for determine 3D coordinates of a scene point given as an image point in a base scene view such that the 3D coordinates may observed in a correct physical position from any other images.

For example, in an embodiment, a computer-implemented method for determining 3D coordinates, implemented in a computer comprising a processor, memory accessible by the processor, and computer program instructions stored in the memory and executable by the processor, may comprise obtaining, at the computer system, a plurality of images including a base image having at least one annotated point corresponding to a point on a surface of an object shown in the base image, and a plurality of side images showing the object from different viewpoints than the base image, wherein the plurality of side images are given with the camera poses relative to the base image, extracting, at the computer system, from at least some of the side images, image patches showing the annotated point, wherein a plurality of sets of image patches are extracted, wherein a set of image patches is extracted at each of a plurality of corresponding candidate depth values, classifying, at the computer system, each set of image patches as having a corresponding candidate depth value that is correct or incorrect, and outputting, at the computer system, a depth value that is determined to be correct.

In embodiments, the plurality of side images may be obtained by selecting side images having a viewpoint distance from the base image that is within a range defined by parallax between each side image and the base image and by the visual similarity between each side image and the base image. The viewpoint distance from the base image may be determined by computing distances between projections of at least one grid of artificial 3D points, wherein the viewpoint distance is determined by image coordinates of the 3D point in each of two images. A candidate depth value may be defined as being correct when a 3D point corresponding to the annotated point is located on the surface of the object in the image, and is defined as being incorrect when a 3D point corresponding to the annotated point is located in front of or inside, behind, or beyond the surface of the object. The method may further comprise, performing, at the computer system, the depth value computation a number of times, using different subsets of relevant image patches from side images, and computing the final depth value as a median of the obtained depth values. The extraction of image patches from the side images for the specified depth value may be performed by first computing a patch size capturing a same scene area as the base image patch, using the relative pose information, and then resizing the side image patch to be the same size, in pixels, as the base image patch. The classifying may be a binary classification of a set of image patches extracted for a specified depth is performed using a deep convolutional neural network. The convolutional neural network may perform receiving input data comprising N image patches of fixed size, for a fixed number N, to N copies of a backbone neural network component with a plurality of convolutional layers, while the N copies of the neural network component share among them a plurality of network parameters comprising weights, outputting from each such backbone neural network component a single feature vector of a fixed size, concatenating the N output feature vectors, produced by the N backbone neural network networks to form one feature vector, providing the concatenated feature vector to a second neural network component comprising a plurality of fully-connected neural layers, followed by a linear layer and a softmax layer with two outputs for the binary classification. Training of the convolutional neural network is performed using a Stochastic Gradient Descent algorithm guided by an objective function comprising a cross-entropy function for the binary classification. The base image patch is provided to the backbone convolutional neural network component with index 0, while the other the image patches are provided to the backbone component in a random order, and wherein, during training, a same set of input patches is used with different ordering of the side patches to train the convolutional neural network to be resilient to the order of input patches.

In an embodiment, a system for determining 3D coordinates, may comprise a processor, memory accessible by the processor, and computer program instructions stored in the memory and executable by the processor to perform: obtaining a plurality of images including a base image having at least one annotated point corresponding to a point on a surface of an object shown in the base image, wherein the plurality of side images are given with the camera poses relative to the base image, and a plurality of side images showing the object from different viewpoints than the base image, extracting, at the computer system, from at least some of the side images, image patches showing the annotated point, wherein a plurality of sets of image patches are extracted, wherein a set of image patches is extracted at each of a plurality of corresponding candidate depth values, classifying, at the computer system, each set of image patches as having a corresponding candidate depth value that is correct or incorrect, and outputting, at the computer system, a depth value that is determined to be correct.

In an embodiment, a computer program product for determining 3D coordinates, may comprise a non-transitory computer readable storage having program instructions embodied therewith, the program instructions executable by a computer, to cause the computer to perform a method comprising: obtaining a plurality of images including a base image having at least one annotated point corresponding to a point on a surface of an object shown in the base image, wherein the plurality of side images are given with the camera poses relative to the base image, and a plurality of side images showing the object from different viewpoints than the base image, extracting, at the computer system, from at least some of the side images, image patches showing the annotated point, wherein a plurality of sets of image patches are extracted, wherein a set of image patches is extracted at each of a plurality of corresponding candidate depth values, classifying, at the computer system, each set of image patches as having a corresponding candidate depth value that is correct or incorrect, and outputting, at the computer system, a depth value that is determined to be correct.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION

Embodiments of the present systems and methods may provide techniques that provide the 3D coordinates for points in a scene such that the points may be observed to be in the correct physical position in any of a series of images. Embodiments may provide the capability to determine 3D points on general non-homogeneous surfaces, corresponding to image points, which may be designated by a user. Embodiments of the present systems and methods may provide the capability to for determine 3D coordinates of a scene point given as an image point in a base scene view such that the 3D coordinates may observed in a correct physical position from any other images.

Figure 1:
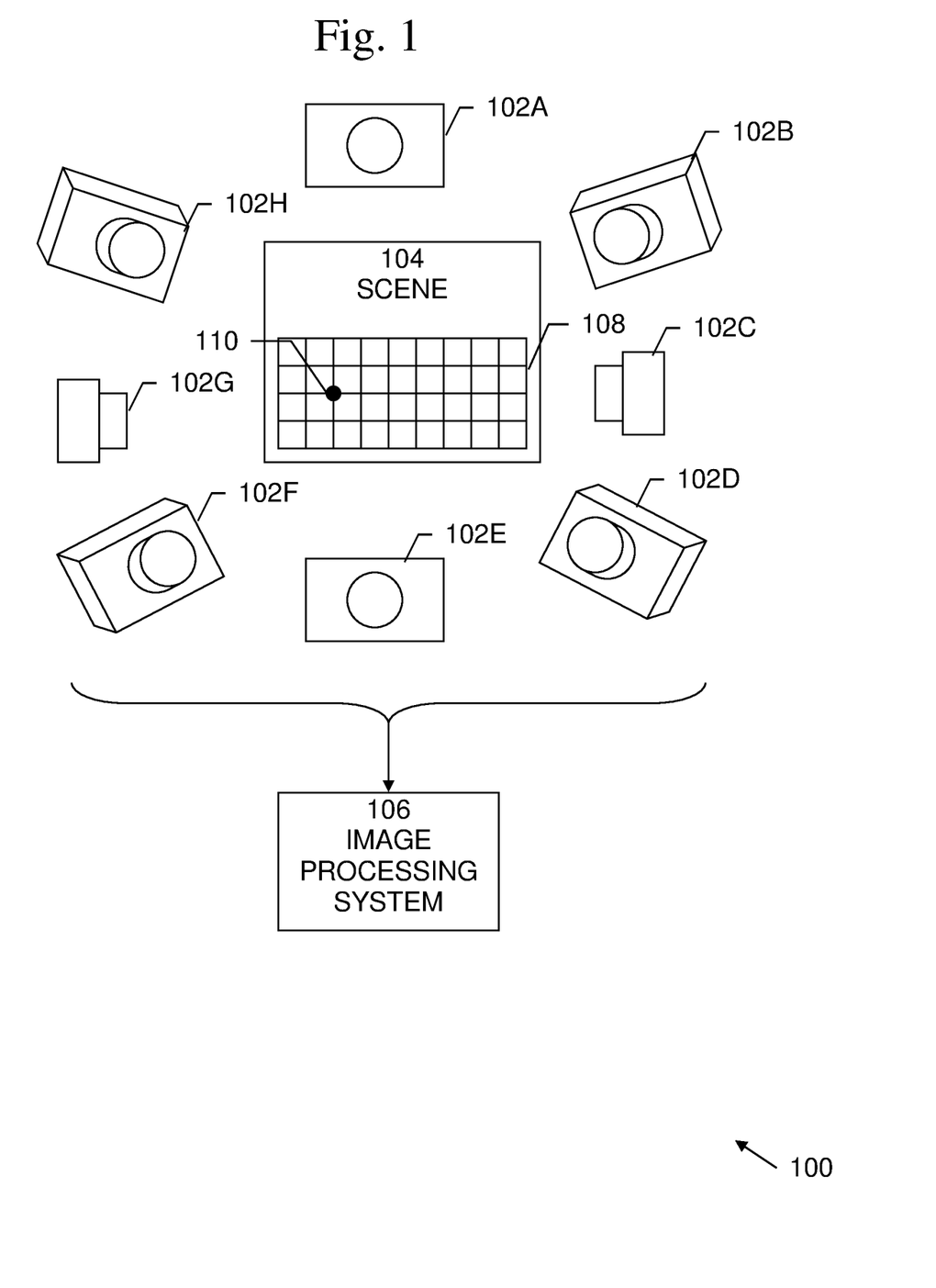
FIG. 1 illustrates an exemplary block diagram of a system in which embodiments of the present systems and methods may be implemented.

An exemplary system 100 in which embodiments of the present systems and methods may be implemented is shown in FIG. 1. As shown in the example of FIG. 1, system 100 may include one or more cameras capturing images of a scene 104 from a plurality of viewpoints 102A-H. In embodiments, the number of cameras may be equal to the number of viewpoints 102A-H from which images may be captured. In embodiments, the number of cameras may be less than the number of viewpoints from which images may be captured, and at least some of the cameras may be moved to more than one viewpoint. In embodiments, there may be only one camera, which may be moved to all of the viewpoints from which images may be captured.

The image data from the camera or cameras may be transmitted to image processing system 106, in which processes involved in embodiments of the present systems and methods may be implemented.

Figure 2:
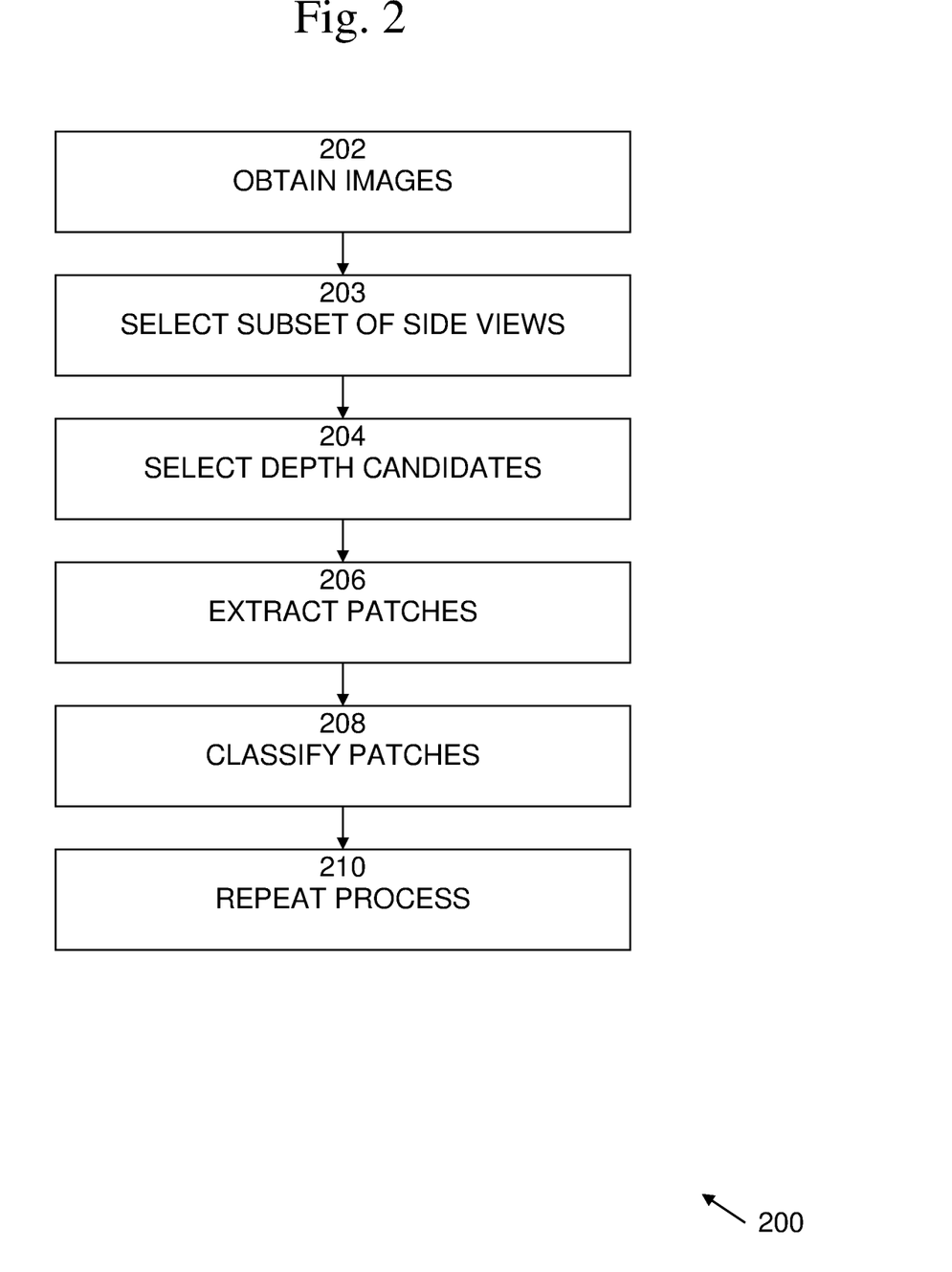
FIG. 2 is an exemplary flow diagram of an embodiment of a process, according to embodiments of the present systems and methods.

An embodiment of a process 200 for performing such a search is shown in FIG. 2. Process 200 begins with 202, in which images may be obtained. For example, a series of images I_1, . . . , I_n, depicting scene 104, may be taken from different poses or viewpoints 102A-F by one or more cameras. All the camera poses with respect to an arbitrary coordinate frame 108 may be known, and the set of images may be registered. That is, the pose transformation relative to the base image, I_b, may be known. In one of the images I_b, the base image, an image point (x,y) 110 may be assigned by person, which may be a user of the camera or someone reviewing the images later. Visually, the point lies on some physical object in the scene. Embodiments of the present systems and methods may find the 3D coordinates for the assigned point, such that that point may be observed in the correct physical position from any other image.

Figure 3:
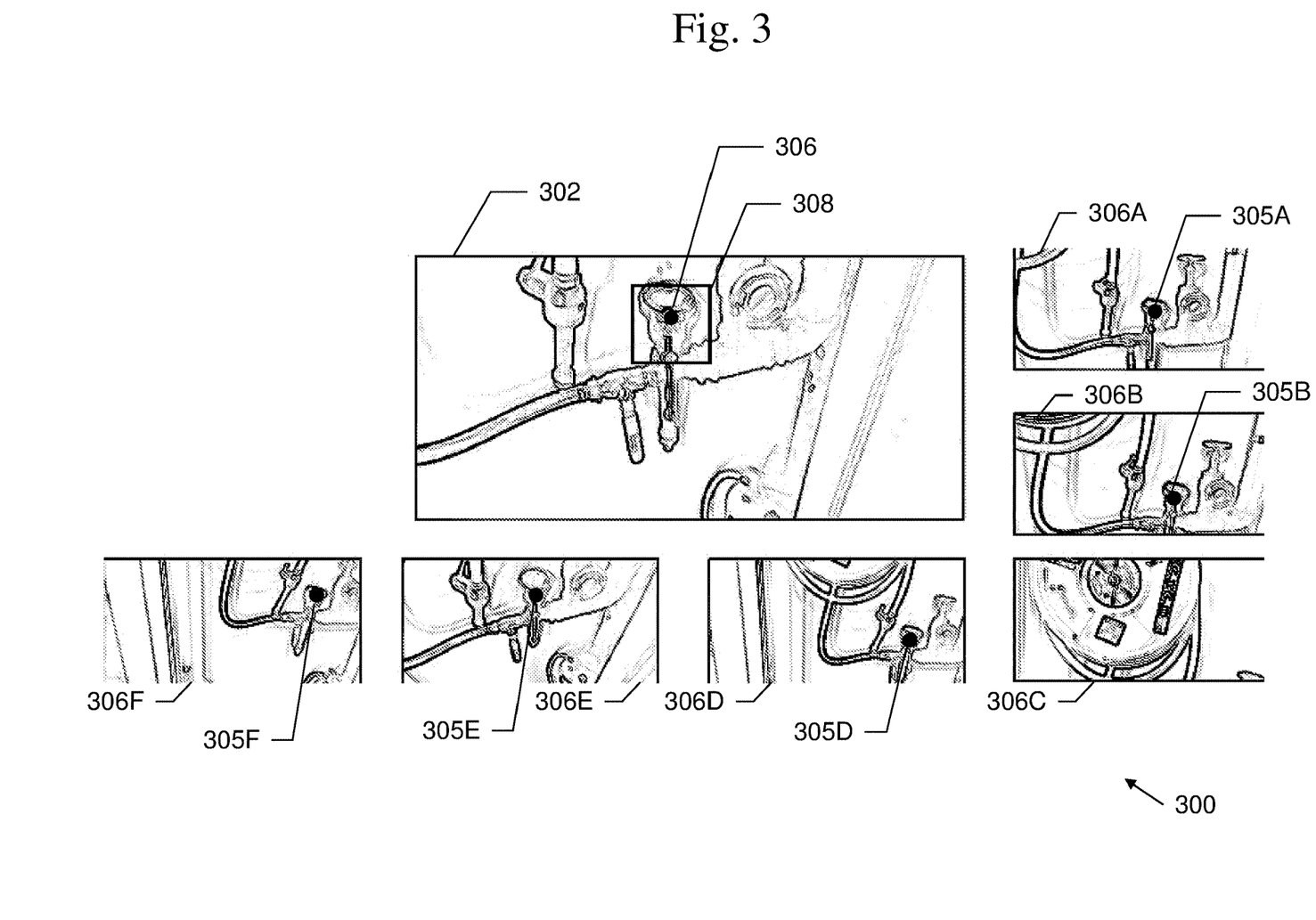
FIG. 3 is an exemplary diagram of plurality of images that may be used by embodiments of the present systems and methods.

For example, a plurality of images 300 that may have been taken by one or more cameras 102A-H is shown in FIG. 3. Images 300 may include a base image 302, including a point annotation 304, and a plurality of side images 306A-F, which may be side views captured near in time to the time that base image 302 was captured. The point that was annotated by point annotation 304 may be included in some of the images, such as point 305A, 305B, 305D, 305E, 305F shown in images 306A, 306B, 306D, 306E, 306F, but not all of the images, such as image 306C. At 203, a subset of side view images that include point 305A, 305B, 305D, 305E, 305F that was annotated in base image 302 may be selected.

At 204, a plurality of depth candidate values may be selected. For example, 20 values for depth candidates may be selected in a range from 0.5 m to 5 m. The intervals between depth candidate values may be fixed or variable. At 206, image patches may be extracted from the images. Each image may be divided into a plurality of image patches, which are adjacent, consecutive, and/or overlapping portions of each image. A query patch 308 may be a patch including the annotated point 304 in base image 302. For each depth in the selected range of candidate depths, an image patch may be extracted from each of the side images using their relative pose transformations. The size of the patch in each side image may be chosen to be in the scale corresponding to the base image. This may result in a plurality of sets of image patches being selected. For each example, if there are 20 candidate depths, there may be 20 sets of image patches selected from among the side images. Typically, each set of image patches may include patches selected from somewhat different selections of side images, depending upon the particular viewpoints used and images that were obtained. However, it is advantageous if each set of images includes at least a sufficient number of images for the later classification to function properly.

In embodiments, the extraction of image patches from the side images for the specified depth value may be performed by first computing a patch size capturing the same scene area as the base image patch, using the relative pose information, and then resizing the side image patch to be the same size, in pixels, as the base image patch.

At 208, the sets of image patches may be classified to determine those patches that correctly correspond to depth values and those that do not. The point depths may be classified using a machine learning model, such as a convolutional neural network or deep convolutional neural network, to classify the depth of each point as correct (located on the surface of the object) or incorrect (located in front of or inside, behind, or beyond the surface of the object). For example, those patches corresponding to depths that are not correct may not correctly show an image of the annotated point, but may show other portions of objects or the scene. As each set of image patches corresponds to a particular candidate depth, the process may classify each set of patches as, for example, "1" when the depth value is correct, and "0" otherwise. Further, the machine learning model may produce depth estimates for each determined point.

Figure 4:
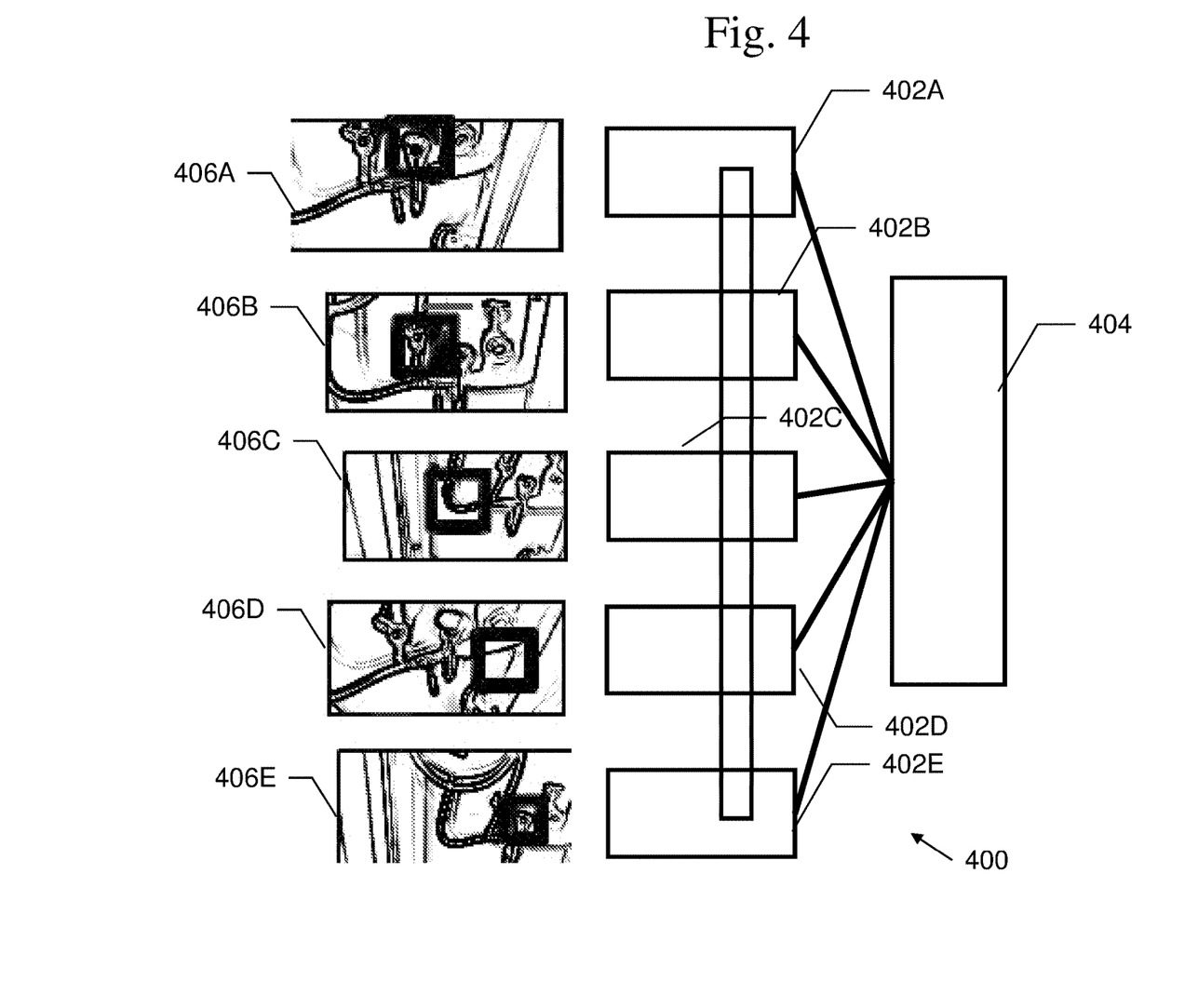
FIG. 4 is an exemplary block diagram of an embodiment of a machine learning model, according to embodiments of the present systems and methods.

An example of a design of such a machine learning model 400 is shown in FIG. 4. In the example shown in FIG. 4, there may be a fixed number of base CNN blocks 402A-E, with common weights. In embodiments, the base CNN blocks may comprise a plurality of convolutional layers, and they may share among them a plurality of network parameters, such as weights. In embodiments, the number of image patches in each set of image patches may correspond to the number of base CNN blocks 402A-E. For example, if 5×7 sets of image patches, including the annotated base image patch, are selected, there may be 35 base CNN blocks. Each base CNN block may produce an internal representation of the features of each patch, such as a feature vector, which may be of a fixed size. The feature vectors from the plurality of base CNN blocks may be concatenated and sent to common dense block 404 for further processing. In embodiments, common dense block 404 may, for example, comprise a plurality of fully-connected neural layers, followed by a linear layer and a softmax layer with two outputs for the binary classification. Training of the CNN may be performed using a Stochastic Gradient Descent algorithm guided by an objective function comprising a cross-entropy function for the binary classification. A loss function, such as cross-entropy loss for binary classification, or a L2-distance loss for regression to a relative depth error, may be used. The base blocks 402A-E may compute visual feature vectors for a set of patches 406A-E. The dense block 404 may consider the collection of feature vectors and may decide whether they correspond to a correct depth.

The training of machine learning model 400 may be done using random fixed-size subsets of relevant patches from each candidate depth. In embodiments, the base image patch may be provided to the backbone convolutional neural network component with index 0, while the other the image may be are provided to the backbone component in a random order. During training, the same set of input patches may be used with different ordering of the side patches to train the convolutional neural network to be resilient to the order of input patches.

At 210, in embodiments, process 200, including at least 202-208, may be repeated a number of times, using different subsets of relevant image patches from the side images, and computing the final depth value as a median of the obtained depth values.

Figure 5:
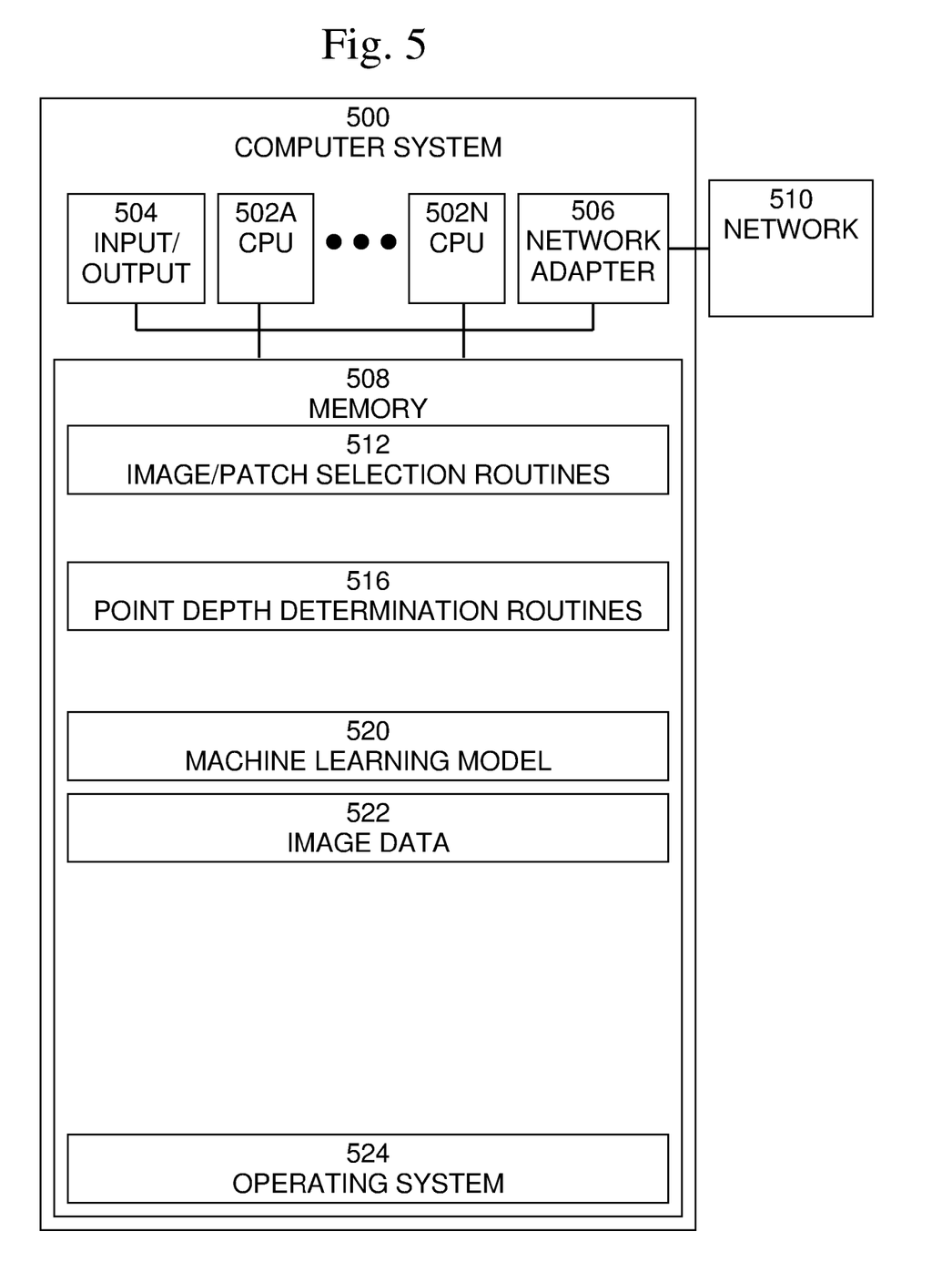
FIG. 5 is an exemplary block diagram of a computer system, in which processes involved in the embodiments described herein may be implemented.

An exemplary block diagram of a computer system 500, in which processes involved in the embodiments described herein may be implemented, is shown in FIG. 5. Computer system 500 may be implemented using one or more programmed general-purpose computer systems, such as embedded processors, systems on a chip, personal computers, workstations, server systems, and minicomputers or mainframe computers, or in distributed, networked computing environments. Computer system 500 may include one or more processors (CPUs) 502A-502N, input/output circuitry 504, network adapter 506, and memory 508. CPUs 502A-502N execute program instructions in order to carry out the functions of the present communications systems and methods. Typically, CPUs 502A-502N are one or more microprocessors, such as an INTEL CORE® processor. FIG. 5 illustrates an embodiment in which computer system 500 is implemented as a single multi-processor computer system, in which multiple processors 502A-502N share system resources, such as memory 508, input/output circuitry 504, and network adapter 506. However, the present communications systems and methods also include embodiments in which computer system 500 is implemented as a plurality of networked computer systems, which may be single-processor computer systems, multi-processor computer systems, or a mix thereof.

Input/output circuitry 504 provides the capability to input data to, or output data from, computer system 500. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 506 interfaces device 500 with a network 510. Network 510 may be any public or proprietary LAN or WAN, including, but not limited to the Internet.

Memory 508 stores program instructions that are executed by, and data that are used and processed by, CPU 502 to perform the functions of computer system 500. Memory 508 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 508 may vary depending upon the function that computer system 500 is programmed to perform. In the example shown in FIG. 5, exemplary memory contents are shown representing routines and data for embodiments of the processes described above. However, one of skill in the art would recognize that these routines, along with the memory contents related to those routines, may not be included on one system or device, but rather may be distributed among a plurality of systems or devices, based on well-known engineering considerations. The present communications systems and methods may include any and all such arrangements.

In the example shown in FIG. 5, memory 508 may include image/patch selection routines 512, point depth determination routines 516, machine learning model 520, image data 522, and operating system 534. Image/patch selection routines 512 may include software routines to select relevant images and extract patches at the correct depth scale from side images included in image data 522 that include the point that was annotated in a base image, as described above. Point depth determination routines 516 may include software routines to determine point depths using, for example, machine learning model 520, to classify the depth of each point depth candidate as correct or incorrect and to provide depth estimates of each determined point, as described above. Operating system 534 may provide overall system functionality.

As shown in FIG. 5, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multi-tasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method for determining 3D coordinates, implemented in a computer comprising a processor, memory accessible by the processor, and computer program instructions stored in the memory and executable by the processor, the method comprising:
    obtaining, at the computer system, a plurality of images including a base image having at least one annotated point corresponding to a point on a surface of an object shown in the base image, and a plurality of side images showing the object from different viewpoints than the base image, wherein the plurality of side images are given with the camera poses relative to the base image;
    extracting, at the computer system, from at least some of the side images, a plurality of image patches corresponding to a plurality of candidate depth values;
    classifying, at the computer system, each set of image patches as having a corresponding candidate depth value that is correct or incorrect, wherein a correct candidate value indicates that the annotated point is located on the surface of the object and an incorrect candidate value indicates that the annotated point is located at least one of in front of, inside, behind, or beyond the surface of the object, wherein the classifying is performed using a machine learning model to determine those patches that do not correctly show an image of the annotated point; and
    outputting, at the computer system, a depth value that is determined to be correct.

2. The method of claim 1, wherein the plurality of side images are obtained by selecting side images having a viewpoint distance from the base image that is within a range defined by parallax between each side image and the base image and by the visual similarity between each side image and the base image.

3. The method of claim 2, wherein the viewpoint distance from the base image is determined by computing distances between projections of at least one grid of artificial 3D points, wherein the viewpoint distance is determined by image coordinates of the projection of the 3D point in each of two images.

4. The method of claim 1, wherein the extraction of image patches from the side images for the specified depth value is performed by first computing a patch size capturing a same scene area as the base image patch, using the relative pose information, and then resizing the side image patch to be the same size, in pixels, as the base image patch.

5. The method of claim 1, wherein the classifying is a binary classification of a set of image patches extracted for a specified depth is performed using a deep convolutional neural network.

6. The method of claim 5, wherein the convolutional neural network performs:
    receiving input data comprising N image patches of fixed size, wherein the received N image patches are inputted to N copies of a backbone neural network component with a plurality of convolutional layers, wherein the N copies of the neural network component share among them a plurality of network parameters comprising weights;
    outputting from each such backbone neural network component a single feature vector of a fixed size;
    concatenating the N output feature vectors, produced by the N backbone neural network networks to form one feature vector;
    providing the concatenated feature vector to a second neural network component comprising a plurality of fully-connected neural layers, followed by a linear layer and a softmax layer with two outputs for the binary classification.

7. The method of claim 6, wherein training of the convolutional neural network is performed using a Stochastic Gradient Descent algorithm guided by an objective function comprising a cross-entropy function for the binary classification.

8. The method of claim 6, wherein the base image patch is provided to the backbone convolutional neural network component with index 0, while the other the image patches are provided to the backbone component in a random order, and wherein, during training, a same set of input patches is used with different ordering of the side patches to train the convolutional neural network to be resilient to the order of input patches.

9. The method of claim 6, further comprising:
    performing, at the computer system, the depth value computation a number of times, using different subsets of relevant image patches from side images, and computing the final depth value as a median of the obtained depth values.

10. A system for determining 3D coordinates, the system comprising a processor, memory accessible by the processor, and computer program instructions stored in the memory and executable by the processor to perform:
    obtaining, at the computer system, a plurality of images including a base image having at least one annotated point corresponding to a point on a surface of an object shown in the base image, and a plurality of side images showing the object from different viewpoints than the base image, wherein the plurality of side images are given with the camera poses relative to the base image;

extracting, at the computer system, from at least some of the side images, a plurality of image patches corresponding to a plurality of candidate depth values;

classifying, at the computer system, each set of image patches as having a corresponding candidate depth value that is correct or incorrect, wherein a correct candidate value indicates that the annotated point is located on the surface of the object and an incorrect candidate value indicates that the annotated point is located at least one of in front of, inside, behind, or beyond the surface of the object, wherein the classifying is performed using a machine learning model to determine those patches that do not correctly show an image of the annotated point; and outputting, at the computer system, a depth value that is determined to be correct.

11. The system of claim 10, wherein the plurality of side images are obtained by selecting side images having a viewpoint distance from the base image that is within a range defined by parallax between each side image and the base image and by the visual similarity between each side image and the base image.

12. The system of claim 11, wherein the viewpoint distance from the base image is determined by computing distances between projections of at least one grid of artificial 3D points, wherein the viewpoint distance is determined by image coordinates of the 3D point in each of two images.

13. The system of claim 10, wherein the extraction of image patches from the side images for the specified depth value is performed by first computing a patch size capturing a same scene area as the base image patch, using the relative pose information, and then resizing the side image patch to be the same size, in pixels, as the base image patch and wherein the classifying is a binary classification of a set of image patches extracted for a specified depth is performed using a deep convolutional neural network.

14. The system of claim 13, wherein the convolutional neural network performs:

receiving input data comprising N image patches of fixed size, wherein the received N image patches are inputted to N copies of a backbone neural network component with a plurality of convolutional layers, wherein the N copies of the neural network component share among them a plurality of network parameters comprising weights;

outputting from each such backbone neural network component a single feature vector of a fixed size;

concatenating the N output feature vectors, produced by the N backbone neural network networks to form one feature vector;

providing the concatenated feature vector to a second neural network component comprising a plurality of fully-connected neural layers, followed by a linear layer and a softmax layer with two outputs for the binary classification.

15. The system of claim 14, wherein training of the convolutional neural network is performed using a Stochastic Gradient Descent algorithm guided by an objective function comprising a cross-entropy function for the binary classification.

16. The system of claim 14, wherein the base image patch is provided to the backbone convolutional neural network component with index 0, while the other the image patches are provided to the backbone component in a random order, and wherein, during training, a same set of input patches is used with different ordering of the side patches to train the convolutional neural network to be resilient to the order of input patches.

17. The system of claim 14, further comprising:

performing, at the computer system, the depth value computation a number of times, using different subsets of relevant image patches from side images, and computing the final depth value as a median of the obtained depth values.

18. A computer program product for determining 3D coordinates, the computer program product comprising a non-transitory computer readable storage having program instructions embodied therewith, the program instructions executable by a computer, to cause the computer to perform a method comprising:

obtaining, at the computer system, a plurality of images including a base image having at least one annotated point corresponding to a point on a surface of an object shown in the base image, and a plurality of side images showing the object from different viewpoints than the base image, wherein the plurality of side images are given with the camera poses relative to the base image;

extracting, at the computer system, from at least some of the side images, a plurality of image patches corresponding to a plurality of candidate depth values;

classifying, at the computer system, each set of image patches as having a corresponding candidate depth value that is correct or incorrect, wherein a correct candidate value indicates that the annotated point is located on the surface of the object and an incorrect candidate value indicates that the annotated point is located at least one of in front of, inside, behind, or beyond the surface of the object, wherein the classifying is performed using a machine learning model to determine those patches that do not correctly show an image of the annotated point; and outputting, at the computer system, a depth value that is determined to be correct.

19. The method of claim 18, wherein the plurality of side images are obtained by selecting side images having a viewpoint distance from the base image that is within a range defined by parallax between each side image and the base image and by the visual similarity between each side image and the base image, and wherein the viewpoint distance from the base image is determined by computing distances between projections of at least one grid of artificial 3D points, wherein the viewpoint distance is determined by image coordinates of the projection of the 3D point in each of two images.

20. The method of claim 18, wherein the extraction of image patches from the side images for the specified depth value is performed by first computing a patch size capturing a same scene area as the base image patch, using the relative pose information, and then resizing the side image patch to be the same size, in pixels, as the base image patch.

* * * * *